(12) United States Patent
Anderson et al.

(10) Patent No.: US 7,412,335 B2
(45) Date of Patent: Aug. 12, 2008

(54) COMPONENT EVALUATIONS USING NON-ENGINE BASED TEST SYSTEM

(75) Inventors: Andy Morris Anderson, San Antonio, TX (US); Gordon James Johnston, San Antonio, TX (US); Cynthia Chaffin Webb, San Antonio, TX (US); Martin John Heimrich, San Antonio, TX (US); Thomas Ray Gabehart, San Antonio, TX (US); Bruce Bruno Bykowski, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 425 days.

(21) Appl. No.: 10/918,330

(22) Filed: Aug. 12, 2004

(65) Prior Publication Data

US 2005/0050950 A1    Mar. 10, 2005

Related U.S. Application Data

(63) Continuation-in-part of application No. 10/213,890, filed on Aug. 6, 2002, now Pat. No. 7,140,874.

(51) Int. Cl.
*G01B 3/44* (2006.01)

(52) U.S. Cl. .......................... 702/34; 702/184; 702/185

(58) Field of Classification Search ................... 702/34, 702/184, 185
See application file for complete search history.

(56) References Cited

U.S. PATENT DOCUMENTS

| | | | |
|---|---|---|---|
| 1,102,510 A | 7/1914 | Irish | |
| 3,030,773 A | 4/1962 | Johnson | |
| 3,131,749 A | 5/1964 | Davis | |
| 3,176,751 A | 4/1965 | Gerlitz | |
| 3,283,502 A | 11/1966 | Lefebvre | 60/39.74 |
| 3,430,443 A | 3/1969 | Richardson et al. | 60/39.65 |
| 3,503,715 A | 3/1970 | Haensel | |
| 3,589,127 A | 6/1971 | Kenworthy et al. | 60/39.65 |
| 3,630,024 A | 12/1971 | Hopkins | |
| 3,685,740 A | 8/1972 | Sheperd | |
| 3,694,135 A | 9/1972 | Dancy et al. | |
| 3,758,258 A | 9/1973 | Kölhi | 431/9 |

(Continued)

FOREIGN PATENT DOCUMENTS

DE    918699    7/1949

(Continued)

OTHER PUBLICATIONS

International Search Report and Written Opinion, PCT/US05/28541, pp. 6, mailing date Jan. 26, 2006.

(Continued)

*Primary Examiner*—John E Barlow, Jr.
(74) *Attorney, Agent, or Firm*—Baker Botts LLP

(57) ABSTRACT

A burner-based system for producing exhaust that simulates the exhaust produced by a production type internal combustion engine. The system is computer controlled so that parameters such as the composition of the exhaust, its rate of flow, and its temperature can be specified. This permits various engine operating conditions to be simulated. An emissions control device can be installed to receive the exhaust, and to thereby undergo rigorous testing. Various tests for durability can be performed.

23 Claims, 3 Drawing Sheets

U.S. PATENT DOCUMENTS

| | | | |
|---|---|---|---|
| 3,818,846 A | 6/1974 | Reese | |
| 3,859,786 A | 1/1975 | Azelborn et al. | 60/39.65 |
| 3,890,088 A | 6/1975 | Ferri | |
| 3,905,751 A | 9/1975 | Hemsath et al. | 431/183 |
| 3,906,718 A | 9/1975 | Wood | 60/39.65 |
| 3,916,619 A | 11/1975 | Masai et al. | 60/39.65 |
| 3,958,413 A | 5/1976 | Cornelius et al. | 60/39.06 |
| 4,035,137 A | 7/1977 | Arand | |
| 4,054,028 A | 10/1977 | Kawaguchi | 60/39.23 |
| 4,054,418 A | 10/1977 | Miller et al. | |
| 4,118,171 A | 10/1978 | Flanagan et al. | |
| 4,171,637 A | 10/1979 | Blanke | 73/118 |
| 4,270,896 A | 6/1981 | Polinkski | |
| 4,345,431 A | 8/1982 | Suzuki et al. | 60/286 |
| 4,348,168 A | 9/1982 | Coulon | 431/9 |
| 4,383,411 A | 5/1983 | Riddel | |
| 4,651,524 A | 3/1987 | Brighton | |
| 4,845,940 A | 7/1989 | Beer | |
| 4,878,380 A | 11/1989 | Goodman | |
| 4,884,555 A | 12/1989 | Huang | 126/350 |
| 5,002,483 A | 3/1991 | Becker | 431/352 |
| 5,082,478 A | 1/1992 | Oono et al. | 55/466 |
| 5,085,577 A | 2/1992 | Muller | |
| 5,140,814 A | 8/1992 | Kreutmair et al. | |
| 5,149,261 A | 9/1992 | Suwa et al. | |
| 5,267,851 A | 12/1993 | Washam et al. | |
| 5,288,021 A | 2/1994 | Sood et al. | |
| 5,303,684 A | 4/1994 | Brown et al. | 123/425 |
| 5,320,523 A | 6/1994 | Stark | |
| 5,339,630 A | 8/1994 | Pettit | |
| 5,396,794 A | 3/1995 | Nichols | |
| 5,493,171 A | 2/1996 | Wood | |
| 5,529,048 A | 6/1996 | Kurihara et al. | |
| 5,553,450 A | 9/1996 | Schnaibel et al. | |
| 5,584,178 A | 12/1996 | Naegeli et al. | |
| 5,590,521 A | 1/1997 | Schnaibel et al. | 60/274 |
| 5,592,924 A | 1/1997 | Audisio | |
| 5,626,014 A | 5/1997 | Hepburn | |
| 5,693,874 A | 12/1997 | De La Cruz et al. | |
| 5,713,336 A | 2/1998 | King | |
| 5,826,428 A | 10/1998 | Blaschke | |
| 5,834,656 A | 11/1998 | Seltzer | 73/863.17 |
| 5,860,277 A | 1/1999 | Schnaibel et al. | |
| 5,899,062 A | 5/1999 | Jerger et al. | |
| 5,974,787 A | 11/1999 | Lemire et al. | |
| 5,974,788 A | 11/1999 | Hepburn et al. | |
| 5,998,210 A | 12/1999 | Hepburn et al. | |
| 6,071,113 A | 6/2000 | Tsubouchi et al. | |
| 6,269,633 B1 | 8/2001 | Van Nieuwstadt | |
| 6,298,729 B1 | 10/2001 | Locker | |
| 6,301,875 B1 | 10/2001 | Backlund et al. | |
| 6,327,889 B1 | 12/2001 | Seltzer et al. | 73/1.02 |
| 6,378,359 B1 | 4/2002 | Dobson et al. | |
| 6,382,182 B1 | 5/2002 | Green | |
| 6,490,858 B2 | 12/2002 | Barrett et al. | |
| 6,532,793 B1 | 3/2003 | Palocz-Andresen | 73/23.31 |
| 6,568,255 B2 | 5/2003 | Pallozzi | 73/116 |
| 6,586,254 B1 | 7/2003 | Kumar | |
| 6,594,990 B2 | 7/2003 | Kuenstler | |
| 6,713,025 B1 | 3/2004 | Ivanescu | |
| 6,761,077 B1 | 7/2004 | Zhu | 73/865.6 |
| 6,823,726 B1 | 11/2004 | Nagy | 73/117.3 |
| 2001/0054281 A1 | 12/2001 | Adams et al. | |
| 2002/0170344 A1 | 11/2002 | Pallozzi | 73/116 |
| 2003/0012700 A1 | 1/2003 | Carnahan | |
| 2003/0079520 A1 | 5/2003 | Ingalls, Jr. et al. | 73/23.31 |
| 2003/0084712 A1 | 5/2003 | Smith et al. | 73/118.1 |
| 2004/0007056 A1 | 1/2004 | Webb et al. | 73/118.1 |
| 2004/0025580 A1 | 2/2004 | Webb et al. | 73/118.1 |
| 2004/0028588 A1 | 2/2004 | Webb et al. | 423/213.2 |
| 2004/0237636 A1 | 12/2004 | Bartley et al. | 73/118.1 |

FOREIGN PATENT DOCUMENTS

| | | |
|---|---|---|
| DE | 3020030 | 12/1981 |
| EP | 0590699 A | 4/1994 |
| EP | 000895024 A2 | 2/1999 |
| EP | 000961013 A2 | 12/1999 |
| FR | 2674333 | 9/1992 |
| GB | 2329853 | 7/1999 |
| GB | 2356826 | 6/2001 |
| JP | 51-111927 | 10/1976 |
| JP | 56-49820 | 5/1981 |
| JP | 04-72410 | 3/1992 |
| JP | 06-264740 | 9/1994 |
| JP | 07-198127 | 8/1995 |
| JP | 11-159386 | 6/1999 |
| JP | 11-270808 | 10/1999 |

OTHER PUBLICATIONS

Drury et al., The Effect of Lubricant Phosphorus Level on Exhaust Emissions in a Field Trial of Gasoline Engine Vehicles, SAE Technical Paper 940745, 1994, SAE International.

Ueda et al., Engine Oil Additive Effects on Deactivation of Monolithic Three-Way Catalysts and Oxygen Sensors, SAE Technical Paper 940746, 1994, SAE International.

Williamson, Catalyst Deactivation Due to Glaze Formation From Oil-Derived Phosphorus and Zinc, SAE Technical Paper 841406, 1984, SAE International.

Joy et al., Influence of Phosphorus on Three-Component Control Catalysts: Catalyst Durability and Characterization Studies, SAE Technical Paper 852099, 1985, SAE International.

Cully et al., The Impact of Passenger Car Motor Oil Phosphorus Levels on Engine Durability, Oil Degradation, and Exhaust Emission in a Field Trial, SAE Technical Paper 952344, 1995, SAE International.

Cully et al., The Impact of Passenger Car Motor Oil Phosphorus Levels on Automotive Emissions Control Systems, SAE Technical Paper 961898, 1996, SAE International.

Ball et al., Application of Accelerated Rapid Aging Test (RAT) Schedules with Poisons: The Effects of Oil Derived Poisons, Thermal Degradation, and Catalyst Volume on FTP Emissions, SAE Technical Paper 972846, 1997, SAE International.

Beck et al., Impact of Sulfur on the Performance of Vehicle-Aged Palladium Monoliths, Applied Catalysis B: Environmental 6, 1995, vol. 185-200.

Jobson et al, Spatially Resolved Effects of Deactivation on Field-Aged Automotive Catalysts, SAE Technical Paper 910173, 1991, SAE International.

Minutes—Oil Protection of Emission System Test II Task Force Held on Aug. 19, 1999, ASTM, Sep. 27, 1999. (Redacted).

Minutes—Oil Protection of Emission System Test II Task Force Held on May 23, 2000, ASTM, Jun. 8, 2000. (Redacted).

Minutes—Oil Protection of Emission System Test (OPEST) II Task Force Held Apr. 4, 2001, ASTM, May 2, 2001, San Antonio, TX. (Redacted).

Jovanovic, Modified apparatus for the simulation of engine exhaust emissions, Goriva Maziva, 1984, pp. 33-38, vol. 23(1).

Casinhas et al., A Pyrolysis cell as simulator for an automobile catalytic converter, Vacuum, 1999, pp. 89-97, vol. 52, Elsevier Science Ltd.

Hepburn, A Comparison Between the Combustion of Isooctane, Methanol, and Methane in Pulse Flame Combustors with Closed Loop A/F Control, SAE Technical Paper 920799, 1992, SAE International.

Southwest Research Institute, Unique SwRI-developed procedures and analytical tools to assist vehicle manufacturers in meeting SULEV standards, Southwest Research Institute News, Feb. 23, 1998, Southwest Research Institute, San Antonio, Texas.

Webb et al., PC-Based Control of a Gasoline-Fueled Burner Aging Test Stand to Simulate Engine Exhaust, LabVIEW for Automotive, Telecommunications, Semiconductor, Biomedical, and other Applications, National Instruments Virtual Instrumentation Series, 2000, Prentice Hall.

Webb et al., Development of a Methodology to Separate Thermal from Oil Aging of a Catalyst Using a Gasoline-Fueled Burner System, SAE Technical Paper 2003-01-0663, 2003, SAE International.

Selby, Development and Significance of the Phosphorus Emission Index of Engine Oils, 13th International Colloquium Tribology—Lubricants, Materials, and Lubrication, 2002, pp. 1-9.

Otto et al., A Laboratory Method for the Simulation of Automobile Exhaust and Studies of Catalyst Poisoning, Journal of the Air Pollution Control Association, Jun. 1974, vol. 24, No. 6.

Ingalls et al., Development of Catalyst Poisoning Evaluation Procedure, 08-9920, Internal Research & Development Program, Annual Report, 1996, p. 53, Southwest Research Institute, San Antonio, Texas.

Ingalls et al., Develop and Test an Apparatus to Evaluate Fuel and Lube Oil Effects on Automotive Catalysts, 08-9949, Internal Research & Development Program, Annual Report, 1996, pp. 53-54, Southwest Research Institute, San Antonio, Texas.

Webb et al., Catalyst Aging Evaluation with Exposure to 0.06 and 0.11 Percent Phosphorus Oils Using the FOCUS Burner System, JSAE 20030269, 2003, SAE 2003-01-1999, Society of Automotive Engineers, Inc.

SAE Presents Automotive Systems Testing Toptec, Oct. 14-15, 1998, Novi, Michigan.

Southwest Research Institute Marketing Brochure, Fuel/Oil Catalyst Aging System, Feb. 1999.

Bykowski, Bruce B., et al.; "Advanced Procedures and Analytical Tools for Meeting SULEV Standards"; Eighth Coordinating Research Council (CRC) On-Road Vehicle Emissions Workshop, vol. 2; San Diego, California; Apr. 1998.

M.N. Ingalls, et al.; "FOCAS—A New Apparatus for Evaluating the Effects of Poisoning on Catalyst Durability," Eighth CRC On-Road Vehicle Emissions Workshop, vol. 2; San Diego, California; Apr. 1998.

McCullough et al., An Experimental Evaluation of the Oil Fouling Effects of Two-Stroke Oxidation Catalysts, Society of Automotive Engineers, Inc., pp. 29-40, 1998.

Preliminary Report on Patentability, PCT/US05/28468, 7 pages, mailed on Jun. 21, 2006.

Weisweiler et al., Simulation of a Driving Cycle in Laboratory: An Approach for Testing Catalysts Suitable for Automotive Exhaust $NO_x$ Abatement Under Lean Conditions, Chemical Engineering and Processing 37, pp. 229-232, 1998.

SAE International, "Automotive Systems Testing Toptec", Oct. 14-15, 1998, Novi, Michigan (SAE Presentation).

Southwest Research Institute, "Fuel/Oil Catalyst Aging System (FOCAS)", 1999.

Proceedings of the Eighth CRC On-Road Vehicle Emissions Workshop, vol. 2; Coordinating Research Council, Inc.; Apr. 20-22, 1998.

COMPONENT EVALUATIONS USING NON-ENGINE BASED TEST SYSTEM

PRIORITY DATA

The present application is a continuation-in-part of U.S. patent application Ser. No. 10/213,890, filed Aug. 6, 2002, now U.S. Pat. No. 7,140,874 published May 1, 2003 as US 2003-0079520 A1, incorporated herein by reference. This application is related to U.S. patent application Ser. No. 11/470,471 filed Sep. 6, 2006; U.S. patent application Ser. No. 11/420,393 filed May 25, 2006; U.S. patent application Ser. No. 11/326,983 filed Jan. 6, 2006; U.S. patent application Ser. No. 10/917,230 filed Aug. 12, 2004; U.S. patent application Ser. No. 10/917,245 filed Aug. 12, 2004; U.S. patent application Ser. No. 10/847,034 filed May 17, 2004; U.S. patent application Ser. No. 10/458,023 filed Jun. 10, 2003; U.S. patent application Ser. No. 10/439,146 filed May 15, 2003, now U.S. Pat. No. 6,983,545 B2; U.S. patent application Ser. No. 10/457,916 filed Jun. 10, 2003, now abandoned; and U.S. patent application Ser. No. 10/213,890 filed Aug. 6, 2002, now U.S. Pat. No. 7,140,874.

RELATED APPLICATIONS

The present application also is related to application Ser. No. 10/457,916, published Jan. 15, 2004 as US 2004-0007056 A1 (pending); application Ser. No. 10/439,146, published Feb. 12, 2004 as US 2004-0025580 A1 (pending); application Ser. No. 10/458,023, published Feb. 12, 2004 as US 2004-0028588 A1 (pending); and, application Ser. No. 10/847,034, filed May 17, 2004 (pending).

FIELD OF THE APPLICATION

The present application relates in general to a method of using a non-engine based test system as a heat source to evaluate one or more components.

BACKGROUND

A variety of tests are used to evaluate vehicle exhaust system components. The tests generally require exposure of the component to hot exhaust gas. In general, the hot exhaust gas is produced using a gasoline bench engine.

The use of a bench engine is relatively labor intensive, requiring the prolonged presence of one or more technicians to maintain the required flowrate(s) and temperature conditions. The cost of labor and the cost of gasoline render bench engine testing relatively expensive.

Less labor-intensive and less costly methods and apparatuses are needed to evaluate components.

SUMMARY

The present application provides a method for evaluating one or more components using a non-engine based test system. The method comprises: providing a non-engine based test system comprising a combustor in fluid communication with the one or more component; supplying fuel and air to the combustor under feed conditions comprising a controlled air to fuel ratio (AFR), the feed conditions being effective to produce a feedstream flowpath; combusting at least a portion of fuel in the feedstream flowpath under combustion conditions effective to produce an exhaust gas while preventing substantial damage to the combustor; and, exposing the one or more components to the exhaust gas under alternate conditions other than those selected from the group consisting of accelerated aging conditions and drive cycle conditions.

DESCRIPTION

Two general areas of development for reducing automotive exhaust emissions are: (1) reducing engine-generated exhaust emissions and (2) optimizing after-treatment of engine generated exhaust emissions. Exhaust after-treatment generally involves one or more catalytic converters in the engine exhaust path.

The primary engine operating parameters that are controlled to optimize engine performance are air flow, fuel flow (or the air-fuel ratio or "AFR"), and ignition timing. Total hydrocarbon emissions are reduced with more rapid catalyst light-off. However, increasing catalyst heating by adjusting the AFR, ignition timing, etc., generally results in higher exhaust emission rates. In order to minimize total emissions, it is desirable to shift to stoichiometric combustion upon catalyst light-off. Optimizing the conversion efficiency of a catalytic converter generally requires controlling the AFR and the catalyst energy (temperature).

Figure 1:
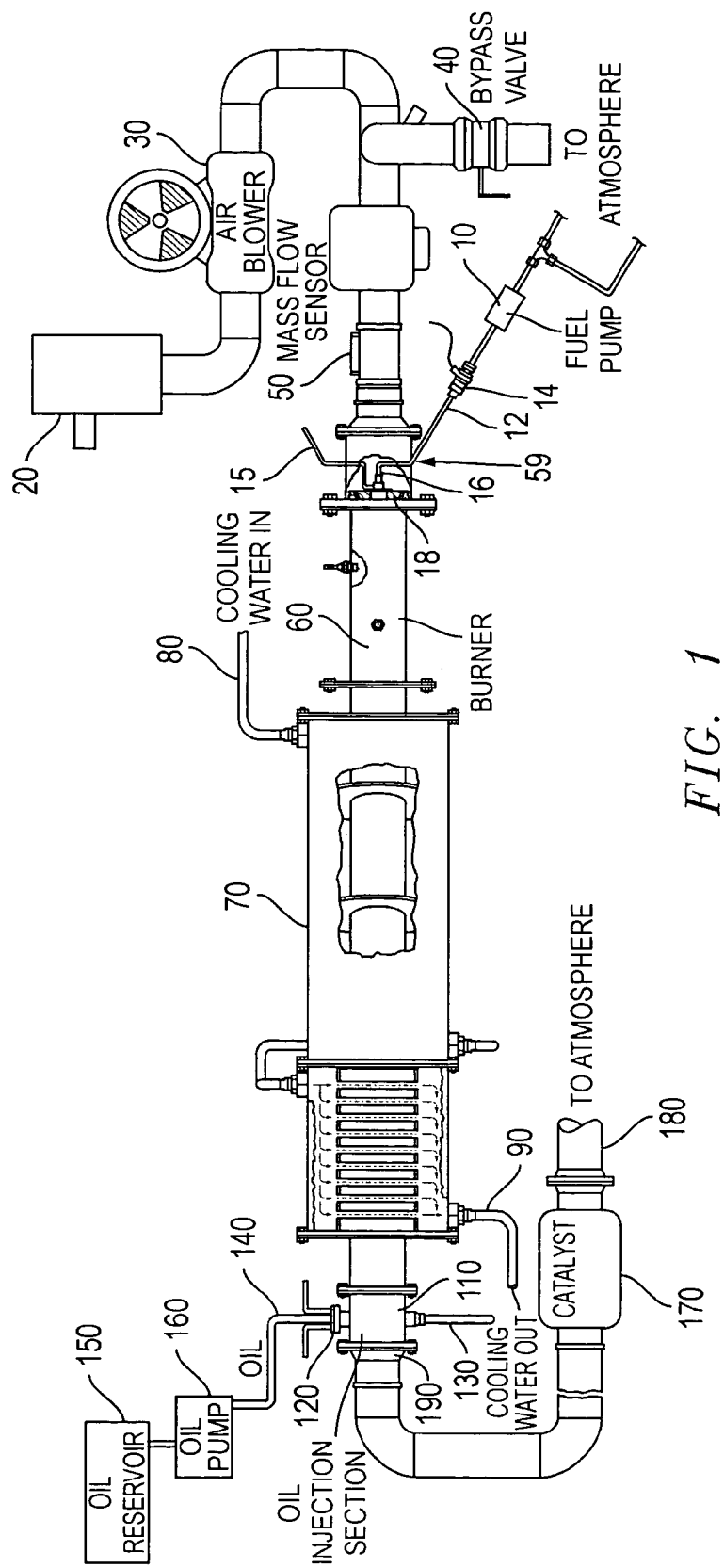
FIG. 1 is a schematic diagram of the FOCAS® rig, a preferred non-engine based exhaust component rapid aging system (NEBECRAS) for use herein, described in U.S. Patent Application Publication No. 20030079520, published May 1, 2003, incorporated herein by reference.

The present application provides methods for accurately testing the foregoing parameters, and others, using a non-engine based heat source. U.S. Patent Application Publication No. 20030079520 describes a NEBECRAS (the FOCAS® rig) for accelerated aging of a catalytic converter. Briefly, the FOCAS® rig comprises: (1) an air supply system to provide air for combustion to the burner, (2) a fuel system to provide fuel to the burner, (3) a burner system to combust the air and fuel mixture and to provide the proper exhaust gas constituents, (4) a heat exchanger to control the exhaust gas temperature, (5) an oil injection system, and (6) a computerized control system. The foregoing components are illustrated in FIG. 1 and described in detail in U.S. Patent Application Publication No. 20030079520, which has been incorporated herein by reference, and will not be described in detail.

The FOCAS® rig was developed to perform aging tests, i.e., to evaluate the long term effects of individual variables on the long term performance of a catalytic converter. The FOCAS® rig is capable of producing an exhaust gas with a composition and temperature corresponding to that produced by the internal combustion engine of a motor vehicle.

The burner system in the FOCAS® rig can be used to supply the heat required to perform a variety of other tests, including, but not necessarily limited to design verification tests and durability tests. Although the FOCAS® rig is a preferred NEBECRAS for use as a heat source in the tests, it will be apparent to persons of ordinary skill in the art that any functional and effective non-engine based test system could be adapted for use in accordance with the principles described herein.

The burner system of a NEBECRAS, such as the FOCAS® rig, can be used to generate stoichiometric, rich, and lean hot gas conditions without substantial damage to the combustor.

In a preferred embodiment, the combustor comprises a feed member comprising a swirl plate which is effective even at a stoichiometric air to fuel ratio (AFR) of producing a feedstream flowpath comprising an air shroud effective to prevent flame from attaching to a feed member during combustion of fuel. The feedstream flowpath also preferably prevents flame from remaining in constant contact with an inner wall of the combustor during combustion of fuel. Heat is supplied via the exhaust gas produced by the NEBECRAS, rather than by a gasoline powered engine.

The present application is directed to the use of a NEBECRAS to perform tests comprising "alternate conditions." The phrase "alternate conditions" refers to substantially any conditions other than the conditions selected from the group consisting of accelerated aging conditions and drive cycle conditions. In a preferred embodiment, the alternate conditions are other than RAT-A cycle conditions, and other than FTP-75 conditions. In a more preferred embodiment, the alternate conditions are selected from the group consisting of vibration conditions, temperature profiling test conditions, thermal stress conditions, quench conditions, light off conditions, and air-fuel ratio sweep conditions.

Accelerated Aging Tests-"Rat-A Cycle Conditions"

"Alternate conditions" are other than "accelerated aging conditions." A separate patent application has been filed with respect to the use of a NEBECRAS to perform accelerated aging. U.S. patent application Ser. No. 10/213,890, filed Aug. 6, 2002, published May 1, 2003 as US 2003-0079520 A1 (pending). The following is a brief description of accelerated aging conditions.

Thermal aging of a catalytic converter can be efficiently accelerated because the rate at which thermal deactivation of a catalytic converter occurs can be increased by operating at higher catalyst temperature. "Accelerated aging conditions" generally involve combinations of elevated catalyst inlet temperatures, chemical reaction-induced thermal excursions (simulating misfire events), and average air/fuel ratio's (AFR's) effective to accelerate aging of a test component. The "RAT-A cycle" refers to the combination of conditions in the General Motors "Rapid Aging Test Cycle." One hundred hours of aging on the GM RAT-A cycle is generally understood to demonstrate a level of durability.

The RAT-A cycle is characterized mainly by steady-state, stoichiometric operation with short thermal excursions. The thermal excursions are created by operating rich, to generate about 3 percent carbon monoxide (CO), while injecting secondary air (about 3 percent oxygen, $O_2$) in front of the catalyst. The excess reductants and oxidants react in the catalyst, releasing the chemical energy in the form of heat. The catalyst inlet temperature and exhaust gas flow rates are also used to specify the test cycle setup. The flow is specified in standard cubic feet per minute (scfm), typically 75 scfm. C. Webb and B. Bykowski, "Development of a Methodology to Separate Thermal from Oil Aging of a Catalyst Using a Gasoline-Fueled Burner System" SAE 2003-01-0663, incorporated herein by reference On the engine, adjusting engine speed sets up the flow specification. The gas temperature at the inlet to the catalyst is achieved by adjusting engine load (throttle position) during the steady-state, stoichiometric portion of the cycle. The thermal excursion is created by adjusting engine operating AFR during the rich portion of the cycle, and adjusting air injection to achieve the 3 percent CO and $O_2$ specification. The table (below) provides the setup conditions for the cycle. It should be noted that the catalyst inlet temperature is specified during the stoichiometric portion of the cycle, but that the exhaust gas concentrations to create the exotherm (and not catalyst inlet temperature) are specified during the thermal excursion portion of the cycle. The two specifications create a thermal profile within the catalyst.

Aging Cycle Specifications:

| Mode No. | Description | Parameter Specification | Mode Length, sec |
|---|---|---|---|
| 1 | Closed-loop, Stoichiometric | Inlet Temperature = 800° C. | 40 |
| 2 | Open-loop, Fuel rich | 3% CO to catalyst | 6 |
| 3 | Open-loop, Fuel Rich with Air Injection | 3% CO, 3% $O_2$ to catalyst | 10 |
| 4 | Closed-loop, Stoichiometric with Air Injection | Stoichiometric out of engine, continue air injection | 4 |

Drive Cycle Simulation Tests "FTP-75 Conditions"

"Alternate conditions" also are other than "drive cycle conditions." A separate patent application has been filed with respect to the use of a NEBECRAS to perform drive cycle testing. Application Ser. No. 10/847,034, filed May 17, 2004 The following is a brief description of drive cycle conditions.

During drive cycle conditions, all of the following conditions are varied to simulate actual driving: exhaust flowrate, exhaust gas temperature, and exhaust gas stoichiometry. FTP-75 conditions include:

1) varying the exhaust flowrate, preferably in the range of from 0 to about 200 standard cubic feet per minute (scfm), to simulate the exhaust flowrates of the test vehicle throughout the FTP;
2) varying the exhaust gas temperature, preferably in the range of from about 20 to about 900° C., to simulate the exhaust gas temperatures at the catalyst inlet throughout the FTP; and,
3) varying the exhaust gas stoichiometry, preferably in the range of from about 10 to about 40 AFR, more preferably from about 10 to about 20 AFR, to simulate the exhaust gas stoichiometry of the vehicle throughout the FTP.

The system exhaust gas mixture ideally contains similar concentrations of hydrocarbons, carbon monoxide, and oxides of nitrogen as seen in the vehicle exhaust at any time during the FTP test.

A number of standard tests exist which may be performed using a NEBECRAS in place of a gasoline engine. Substantially any component, including automotive and non-automotive components, may be tested using the method of the present application. Preferred components are automotive components, preferably vehicle exhaust system components. A more preferred component is a catalytic converter. Other such components include, but are not necessarily limited to exhaust manifolds, exhaust pressure sensors, all types of catalysts, all types of particulate filters and traps, EGR valves, EGR coolers, EGR systems and components, exhaust system components, flanges, tubing, gaskets, couplings, vibration isolators, flow diverters, oxygen sensors, exhaust tubing, mufflers, and combinations thereof. Other types of catalysts include, but are not necessarily limited to three-way catalysts (TWC), lean $NO_x$ catalysts (LNC), lean $NO_x$ traps (LNT), selective catalytic reduction (SCR), hydrocarbon traps, adsorbers, absorbers. Diesel particulate filters, including catalyzed and non-catalyzed DPFs, also may be tested using the present method, but are the subject of a separate application.

The non-engine based test system, preferably a FOCAS® system, may be deactivated, the system may be cooled to ambient conditions in a matter of minutes, and then immediately after cooling, the system can be used to perform additional testing. The system offers improved repeatability and reduced cool down time. The system also offers relatively easy maintenance compared to gasoline engines, which require periodic maintenance (oil changes, tune-ups) and time consuming repairs. The system also is relatively simple (with less moving parts and friction areas) and can operate with improved fuel economy when operated lean. These advantages make it highly desirable as a research and development tool.

Alternate Conditions

"Alternate conditions" are other than accelerated aging conditions and drive cycle conditions, and generally comprise:
 (a) varying one or more operating condition selected from the group consisting of temperature, time interval between changes in temperature, air-fuel ratio, and combinations thereof, and,
 (b) varying one or more other conditions while maintaining substantially constant one or more operating conditions selected from the group consisting of temperature, air-fuel ratio, and combinations thereof.

The following is a specific description of a number of tests falling in categories (a) and (b). The description is illustrative only, and should not be construed as limiting the claims to preferred embodiments:
 a) Varying an operating condition selected from the group consisting of temperature, time interval between changes in temperature, air-fuel ratio, and a combination thereof:

Tests in category (a) include, but are not necessarily limited to design verification tests, including durability tests. Such tests may comprise one or more different parameters compared to accelerated aging and drive cycle testing. Examples of a "different parameter" include, but are not necessarily limited to parameters selected from the group consisting of stepped temperatures, shorter intervals between temperature cycles, enhanced magnitude temperature cycling, multiple repetitions of the foregoing types of cycling, and combinations thereof.

Specific examples of tests in category (a) include, but are not necessarily limited to shell deformation testing, temperature profile testing, thermal cycling, converter light-off testing, and air-fuel ratio sweeps. The foregoing tests are described in more detail below:

Shell Deformation Testing

A catalytic converter generally is constructed such that a catalyst carrier is encased within a shell. The monolithic catalyst carrier generally is formed of ceramic, which is brittle and tends to be readily damaged. In order to prevent damage, the catalyst generally is elastically supported within the shell.

The present application provides a method for evaluating the tendency of the shell to expand, generally called shell deformation tests, using a non-engine based test system. In a shell deformation test, a catalytic converter (330 in FIG. 1) comprising a container in fluid communication with the hot exhaust gas generated by the NEBECRAS, preferably a FOCAS® rig, is exposed to several heat-up and cool-down periods. In other words, the alternate stress conditions comprise exposing the component to exhaust gas at a first temperature for a first period of time and exposing the component to exhaust gas at a second temperature for a second period of time. The first temperature is sufficiently different than the second temperature to evaluate the dynamic and permanent response of the component (preferably comprising a catalytic converter and shell) to the first and second temperature.

Temperature Profile Testing

Temperature profile testing entails exposing the component(s) to high-temperature (steady-state) step increases, preferably under steady AFR and flow rate conditions, in order to acquire internal (catalyst) and external (can surface) thermal gradient information. The alternate conditions generally comprise incrementally increasing the temperature of the exhaust product to produce the thermal gradient conditions, although the temperature also may be incrementally decreased. In other words, the catalytic converter is exposed to a first temperature for a first period of time, then to a second temperature for a second period of time, then to a third temperature for a third period of time, and so on. The component is evaluated using known methods to determine the external and internal impact of exposure to the thermal gradient.

Thermal Cycling

The present application uses a NEBECRAS to generate hot exhaust gas for thermal cycling tests.

Thermal cycling severely stresses the test component by rapidly and repeatedly changing the test component temperature. The test component, preferably a catalytic converter, is exposed to a first temperature for a first period of time, and then to a second temperature for a second period of time, and so forth. The first temperature and the second temperature are sufficiently different to thermally stress the component.

Thermal cycling also tests the durability of a monolithic catalyst. Conventional ceramic monolithic catalysts generally consist of a ceramic support with a coating upon which the catalyst is actually deposited. In order to obtain substantial density and strength, the ceramic material normally must be fired at a high temperature. Such high-temperature firing necessarily sinters the ceramic material, producing a very small surface area. Consequently, the ceramic must be coated with another material having a higher surface area, as well as specific chemical characteristics required for deposit of the catalyst. The high surface area coating or "washcoat" and the underlying ceramic material generally have different thermal expansion coefficients. When the component is exposed to thermal cycling, the high surface area coating may tend to flake off of the underlying ceramic support.

Light Off Testing

Light off testing determines the temperature at which a catalytic converter becomes catalytically active. Rapid catalyst light off generally is desirable in order to reduce cold start emissions. The present application provides a method which uses a NEBECRAS, preferably a FOCAS® rig, as the heat source during light-off testing.

During "light-off" testing, a catalytic converter is exposed to exhaust gas at an initial temperature and the temperature is increased to a temperature greater than the light off temperature. The concentration of exhaust gas components is substantially continuously measured before exposure to the catalytic converter and after exposure to the catalytic converter.

The initial temperature of the hot exhaust gas is below the light off temperature of the test catalyst. The light off temperature will vary with the particular catalytic converter and with the exhaust gas composition. Where the exhaust gas is produced from gasoline, the initial temperature is about 200° C. or less, preferably less than 200° C.

The "light-off" point for the catalytic converter is the point at which the conversion efficiency increases, as indicated when the catalyst bed temperature exceeds the inlet temperature. Where the exhaust gas is produced from gasoline, catalyst light off generally occurs at about 250° C.

Air-Fuel Ratio Sweeps

Figure 3:
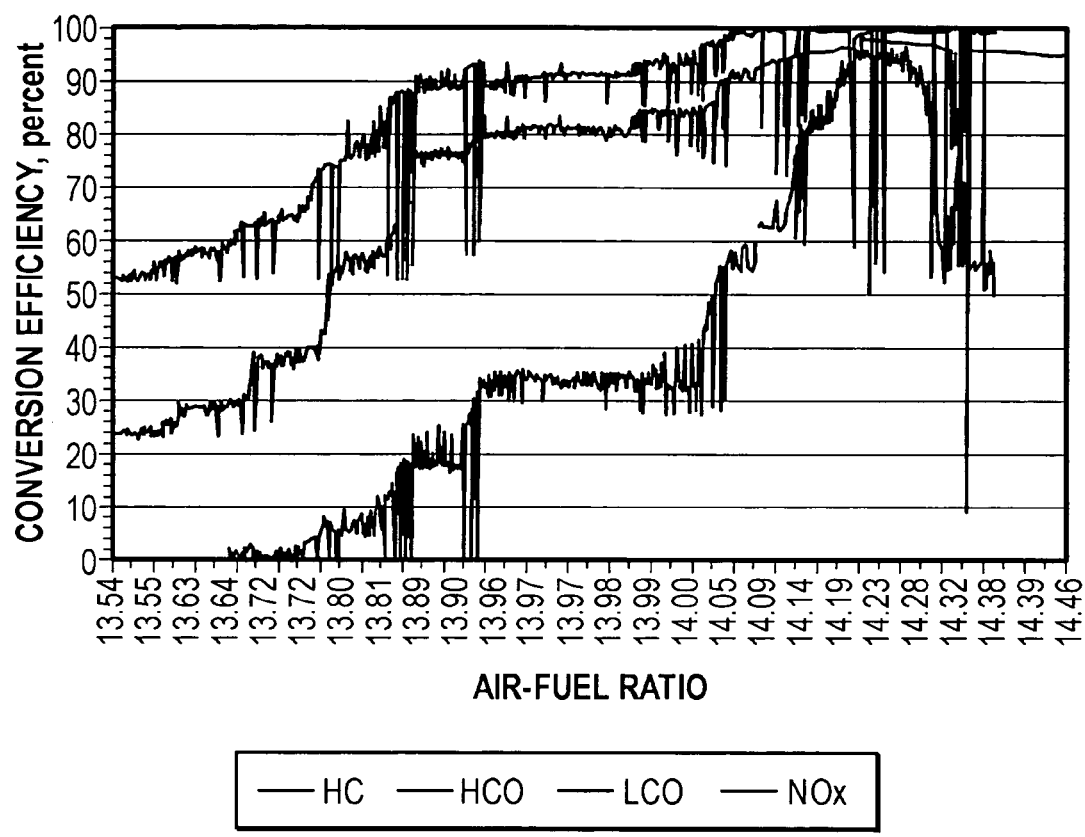
FIG. 3 is a graph of data generated during an Air-to-Fuel Ratio sweep test using a bench engine.

The application provides a method in which a NEBECRAS is used as the exhaust gas generator and heat source during air-fuel ratio sweeps. In order to assess catalytic conversion at different AFR's, exhaust components are measured while the AFR is adjusted from lean to rich (or vice versa). In stepped AFR sweep tests, each AFR is maintained until steady-state operation is achieved. In continuous AFR sweep tests, AFR is continuously adjusted at a predetermined rate. FIG. 3 graphically depicts the results of an air-to-fuel ratio sweep using a bench engine test cell.

(b) Varying one or more other conditions while maintaining substantially constant one or more operating conditions selected from the group consisting of temperature, air-fuel ratio, and combinations thereof;

Tests in category (b) typically are durability tests, which evaluate the physical integrity of the component(s). In such tests, the alternate conditions generally comprise heat, via the exhaust gas, and comprise additional stress conditions other than thermal stress. Examples of additional stress conditions include, but are not necessarily limited to, exposure to liquid, exposure to vibration (exposure to acceleration or acceleration force), change in component orientation, repetitive exposure to any of the foregoing, and combinations thereof. Hot vibration testing and quench testing are exemplary, and are described in more detail below:

Hot Vibration Testing

Figure 2:
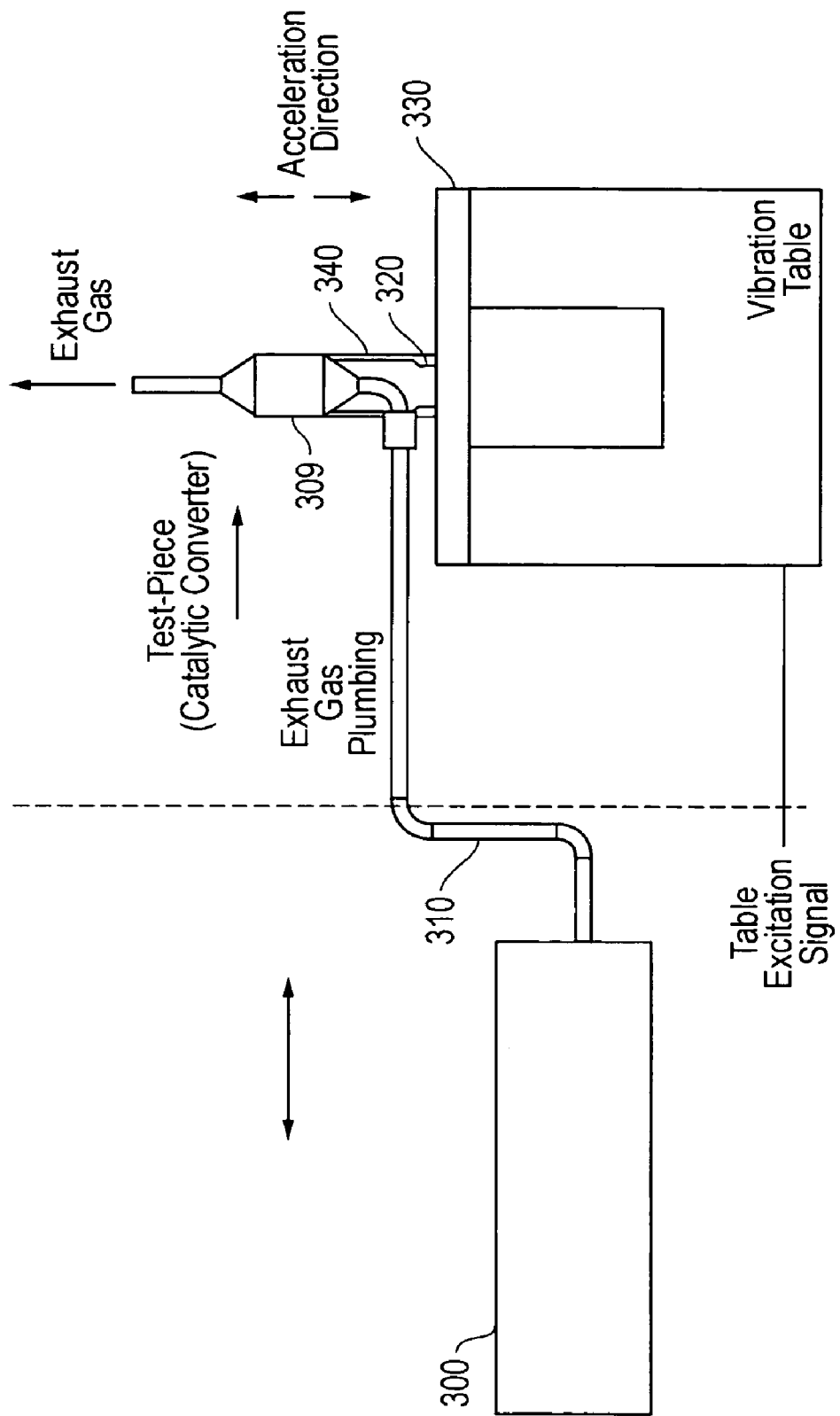
FIG. 2 is a box diagram of a system equipped to provide alternate stress conditions according to the present method.

In hot vibration testing, the FOCAS® rig or other NEBECRAS is substituted for a gasoline engine or other heating apparatus in a known hot vibration testing rig, such as that described in U.S. Pat. No. 6,298,729, incorporated herein by reference. Referring to FIG. 2, the exhaust gas generated by the NEBECRAS 300 fluidly communicates with the test fixture 320 via plumbing 310. The apparatus is in mechanical communication with a vibration generator 330, preferably via a vibration isolation coupling 340. The component(s) 330 are placed in the test fixture 320 in mechanical communication with the vibration generator 330, preferably a vibration table, which fluidly communicates 310 with the hot exhaust gas generated by the NEBECRAS, preferably a FOCAS® rig. In a preferred embodiment, the test component(s) are fastened to a shaker table which is sealingly engaged with exhaust gas plumbing 310 via a vibration isolation coupling 340. The shaker table and/or fixtures appended thereto are adapted to provide vertical, horizontal, and angled component orientations. The component(s) are subjected to extended periods of exposure to vibration and steady-state or transient hot exhaust gas flow.

In a preferred embodiment of hot vibration testing, the component is fixed to a shaker table and exposed to hot exhaust gas. The vibration table is activated to vibrate at a predetermined vibration frequency and amplitude, and the acceleration of the component is determined by a detector in rigid attachment to the component (not shown). The amplitudes of the excitation energy simulate the range of motion that the component would encounter on an actual vehicle. The input amplitudes of the applied vibration may be increased to accelerate test severity, and the frequency distribution of the vibration may be set to match exhaust system vibration conditions for a particular motor vehicle or for particular vehicle operating conditions.

The forces transferred across the component are detected by a load cell and collected and analyzed as testing progresses.

The vibration generator may have any suitable structure. See, e.g., U.S. Pat. No. 6,672,434; U.S. Patent Application Publication 20040025608, incorporated herein by reference.

Quench Testing

Quench testing simulates conditions when the catalytic converter of a vehicle is exposed to water as, for example, when the vehicle drives through a puddle or a flooded area. In quench tests, the component is exposed to a relatively constant exhaust gas temperature, but the component surface is rapidly cooled with liquid, preferably water, either as a spray or by submerging. Where the liquid is water, the water may be fresh or saltwater, and may comprise contaminants.

The rig used to perform water quench tests will include a liquid feed member in fluid communication with a source of liquid and with the test component surface, preferably a catalytic converter surface. The liquid feed member is activated during the test to expose the surface to the liquid, either a single time or repeatedly. In a preferred embodiment, the liquid feed member, preferably a nozzle or manifold apparatus, is effective to spray the surface of the component with liquid or submerge the component in liquid. The component is then evaluated using known methods to assess the impact of the surface cooling on the component.

As seen above, preferred alternate conditions include, but are not necessarily limited to repetitive heating and cooling periods, stepwise temperature increases, rapid changing of temperature, exposure to external liquid, gradual increase in temperature until light off of a given catalytic converter, sweep tests using gradually increased air to fuel ratios, and combinations thereof.

Persons of ordinary skill in the art will recognize that many modifications may be made to the present application without departing from the spirit and scope of the application. The embodiment described herein is meant to be illustrative only and should not be taken as limiting the application, which is defined in the claims.

We claim:

1. A method for using a burner-based automotive exhaust gas simulation system to test an automotive exhaust system component, comprising:

providing a burner system having at least a burner for receiving air and fuel having an air-fuel ratio and for combusting fuel to produce simulated engine exhaust; an exhaust line for carrying the exhaust from the burner to the component; and a heat exchanger for cooling the exhaust gas downstream the burner;

placing the component in the exhaust line downstream the heat exchanger;

using a computerized control system to control the ratio of fuel and air combusted by the burner, and to control the temperature of the exhaust at the input to the component; and using the component to treat the exhaust during specified operating conditions of temperature and air-fuel ratio;

exposing the component to vibration during the step of using the component; and evaluating the effect of the vibration on the component.

2. The method of claim 1, wherein the burner system is operable to maintain stable operation at an air to fuel ratio of from about 10:1 to 40:1.

3. The method of claim 1, further comprising providing supplemental oxygen into the exhaust.

4. The method of claim 1, wherein the supplemental oxygen is controlled to provide the exhaust with an oxygen content of at least 3%.

5. The method of claim 1, wherein the air-fuel ratio is controlled to provide the exhaust with a carbon monoxide component of the exhaust of at least 3%.

6. The method of claim 1, wherein the burner is operable to produce exhaust having a temperature up to 900 degrees C.

7. The method of claim 6, wherein the component has a thermal gradient between its internal and external temperature, and wherein the exhaust gas temperature is incrementally increased to produce a number of thermal gradient states.

8. The method of claim 1, wherein at least one of the following group of operating conditions is also specified: exhaust gas temperature, time interval between changes in temperature, and air-fuel ratio.

9. The method of claim 7, wherein the air-fuel ratio is varied to a number of air-fuel ratios, each achieving steady state condition.

10. The method of claim 7, wherein the air-fuel ratio is continuously varied at a predetermined rate.

11. The method of claim 1 wherein at least one of the following group of operating conditions is held constant: exhaust gas temperature and air-fuel ratio.

12. The method of claim 1, wherein the exposing step is performed during steady state stoichiometric conditions.

13. A method for using a burner-based automotive exhaust gas simulation system to test an automotive exhaust system component, comprising:

providing a burner system having at least a burner for receiving air and fuel having an air-fuel ratio and for combusting fuel to produce simulated engine exhaust; an exhaust line for carrying the exhaust from the burner to the component; and a heat exchanger for cooling the exhaust gas downstream the burner;

placing the component in the exhaust line downstream the heat exchanger;

using a computerized control system to control the A/F ratio of fuel and air combusted by the burner, and to control the temperature of the exhaust at the input to the component; and exposing the component to the exhaust during an air-fuel ratio sweep;

wherein the air-fuel ratio sweep is a continuous sweep at a predetermined rate of change of the air-fuel ratio.

14. The method of claim 13, wherein the air-fuel ratio sweep is a stepped sweep, such that each air-fuel ratio is maintained until steady state conditions are achieved.

15. The method of claim 13, wherein the air-fuel ratio is varied between lean and rich conditions.

16. The method of claim 13, wherein the air-fuel ratio may be varied in a range of air-fuel ratios between 10:1 and 40:1.

17. A method for using a burner-based automotive exhaust gas simulation system to age an emissions control device in the exhaust line of an internal combustion engine, comprising:

providing a burner for receiving air and fuel and for combusting a fuel feedstream to produce simulated engine exhaust;

providing an exhaust line for carrying the exhaust from the burner to the emissions control device;

providing a cooling device for cooling the exhaust gas downstream the burner;

placing the emissions control device on the exhaust line downstream the cooling device;

providing an air injection device for injecting air into the exhaust line between the burner and the emissions control device;

using a control system to simulate a number of engine cycles, each cycle having a succession of engine operating modes, by controlling at least the following engine operating parameters: the ratio of air and fuel received by the burner, the rate of flow of exhaust from the burner; and the temperature of the exhaust gas at the inlet to the emissions control device;

wherein the simulated operating modes are at least the following modes: closed loop stoichiometric, open loop rich without air injection, open loop rich with air injection, closed loop stoichiometric with air injection; and exposing the emissions control device to the exhaust gas for a number of engine cycles; and varying the exhaust gas flowrate.

18. The method of claim 17, further comprising the step of varying the exhaust gas temperature at the input to the emissions control device.

19. The method of claim 17, further comprising the step of varying the exhaust gas stoichiometry from a range of 10:1 to 20:1.

20. The method of claim 17, further comprising the step of varying the exhaust gas stoichiometry from a range of 10:1 to 40:1.

21. A method for using a burner-based automotive exhaust gas simulation system to test an automotive exhaust system component, comprising:

providing a burner system having at least a burner for receiving air and fuel having an air-fuel ratio and for combusting fuel to produce simulated engine exhaust; an exhaust line for carrying the exhaust from the burner to the component; and a heat exchanger for cooling the exhaust gas downstream the burner;

placing the component in the exhaust line downstream the heat exchanger;

using a computerized control system to control the ratio of fuel and air combusted by the burner, and to control the temperature of the exhaust at the input to the component;

using the component to treat the exhaust during specified operating conditions of temperature and air-fuel ratio;

providing supplemental oxygen into the exhaust, wherein the supplement oxygen is controlled to provide the exhaust with an oxygen content of at least 3%; and evaluating the effect of the exposing steps on the component.

22. A method for using a burner-based automotive exhaust gas simulation system to test an automotive exhaust system component, comprising:

providing a burner system having at least a burner for receiving air and fuel having an air-fuel ratio and for combusting fuel to produce simulated engine exhaust; an exhaust line for carrying the exhaust from the burner to the component; and a heat exchanger for cooling the exhaust gas downstream the burner;

placing the component in the exhaust line downstream the heat exchanger;

using a computerized control system to control the ratio of fuel and air combusted by the burner, and to control the temperature of the exhaust at the input to the component; and using the component to treat the exhaust during specified operating conditions of temperature and air-fuel ratio;

wherein the air-fuel ratio is controlled to provide the exhaust with a carbon monoxide content of at least 3%; and evaluating the effect of the exposing steps on the component.

23. A method for using a burner-based automotive exhaust gas simulation system to test an automotive exhaust system component, comprising:

providing a burner system having at least a burner for receiving air and fuel having an air-fuel ratio and for combusting fuel to produce simulated engine exhaust; an exhaust line for carrying the exhaust from the burner to the component; and a heat exchanger for cooling the exhaust gas downstream the burner;

placing the component in the exhaust line downstream the heat exchanger;

using a computerized control system to control the ratio of fuel and air combusted by the burner, and to control the temperature of the exhaust at the input to the component;

using the component to treat the exhaust during specified operating conditions of temperature and air-fuel ratio;

exposing the component to liquid applied to the external surface of the component, during the step of using the component; and evaluating the effect of the exposing steps on the component.

* * * * *

UNITED STATES PATENT AND TRADEMARK OFFICE
CERTIFICATE OF CORRECTION

| | | |
|---|---|---|
| PATENT NO. | : 7,412,335 B2 | Page 1 of 1 |
| APPLICATION NO. | : 10/918330 | |
| DATED | : August 12, 2008 | |
| INVENTOR(S) | : Andy Morris Anderson et al. | |

It is certified that error appears in the above-identified patent and that said Letters Patent is hereby corrected as shown below:

Title page, item [75] second inventor should be -- Gordon James Johnston Bartley --.

Signed and Sealed this

Twenty-second Day of February, 2011

David J. Kappos
*Director of the United States Patent and Trademark Office*